United States Patent
Kayama et al.

(10) Patent No.: US 8,305,854 B2
(45) Date of Patent: Nov. 6, 2012

(54) OPTICAL DISC DRIVE

(75) Inventors: Hiroshi Kayama, Osaka (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/984,721

(22) Filed: Jan. 5, 2011

(65) Prior Publication Data

US 2011/0170386 A1 Jul. 14, 2011

(30) Foreign Application Priority Data

Jan. 12, 2010 (JP) ................................ 2010-003746

(51) Int. Cl.
*G11B 7/00* (2006.01)
(52) U.S. Cl. ............... 369/47.52; 369/47.53; 369/59.11; 369/44.26
(58) Field of Classification Search ...... 369/47.5–47.53, 369/116, 59.11, 59.12, 44.26, 53.26
See application file for complete search history.

(56) References Cited

U.S. PATENT DOCUMENTS

| | | | | |
|---|---|---|---|---|
| 5,572,502 A | * | 11/1996 | Naruse et al. | 369/116 |
| 2003/0054128 A1 | * | 3/2003 | Sako et al. | 428/64.4 |
| 2004/0027980 A1 | * | 2/2004 | Sako et al. | 369/272 |
| 2004/0047252 A1 | * | 3/2004 | Miyatake et al. | 369/275.3 |
| 2005/0058028 A1 | * | 3/2005 | Aoyama et al. | 369/275.4 |
| 2007/0237060 A1 | * | 10/2007 | Ohno et al. | 369/275.1 |
| 2011/0007616 A1 | * | 1/2011 | Yamaoka et al. | 369/47.51 |

FOREIGN PATENT DOCUMENTS

JP 05-109206 4/1993

OTHER PUBLICATIONS

Co-pending U.S. Appl. No. 12/983,963, filed Jan. 4, 2011.
Co-pending U.S. Appl. No. 12/984,715, filed Jan. 5, 2011.
Co-pending U.S. Appl. No. 13/201,665, filed Aug. 16, 2011.

* cited by examiner

*Primary Examiner* — Thang Tran
(74) *Attorney, Agent, or Firm* — Renner, Otto, Boisselle & Sklar, LLP

(57) ABSTRACT

An optical disc drive according to the present invention includes an optical pickup and a writing control section for instructing the optical pickup to record a mark, representing the information to be written, on the optical disc. In recording the mark on the optical disc, the writing control section instructs the optical pickup to irradiate the same area on the optical disc with a light beam a plurality of times so that the mark is recorded in that repeatedly irradiated area.

12 Claims, 9 Drawing Sheets

TRACK (GUIDE GROOVE)

OPTICAL DISC DRIVE

BACKGROUND OF THE INVENTION

1. Field of the Invention

The present invention relates to an optical disc drive that can write information on an optical disc.

2. Description of the Related Art

In optical disc technologies, data can be read out from a rotating optical disc by irradiating the disc with a relatively weak light beam with a constant intensity and detecting the light that has been modulated by, and reflected from, the optical disc. On a read-only optical disc, information is already stored as pre-pits that are arranged either concentrically or spirally during the manufacturing process of the optical disc. On the other hand, on a rewritable optical disc, a recording material film, from/on which data can be read and written optically, is deposited by evaporation process, for example, on the surface of a substrate on which concentric or spiral grooves are arranged. In writing data on a rewritable optical disc, data is written there by irradiating the optical disc with a pulsed light beam, of which the optical power has been changed according to the data to be written, and locally changing the property of the recording material film.

In a recordable or rewritable optical disc, when data is going to be written on its recording material film, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the optical power of the light beam for writing data (i.e., optical recording power) had an inappropriate level, then the recorded mark would have a deformed shape and sometimes it could be difficult to read the data as intended.

To read data that is stored on an optical disc or to write data on a rewritable optical disc, the light beam always needs to maintain a predetermined converging state on a target track. For that purpose, a "focus control" and a "tracking control" need to be done. The "focus control" means controlling the position of an objective lens along a normal to the surface of the optical disc (such a direction will sometimes be referred to herein as "optical disc depth direction") so that the focal point (or at least the converging point) of the light beam is always located on the target track. On the other hand, the "tracking control" means controlling the position of the objective lens along the radius of a given optical disc (which direction will be referred to herein as a "disc radial direction") so that the light beam spot is always located right on the target track.

In order to perform such a focus control or a tracking control, the focus error or the tracking error needs to be detected based on the light that has been reflected from the optical disc and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical disc.

Japanese Patent Application Laid-Open Publication No. 5-109206 (which will be referred to herein as "Patent Document No. 1") discloses a technique for reducing the need for re-recording, which would be troublesome for the user, by eliminating as much as possible the lack of information that should have been written on an optical disc.

However, Patent Document No. 1 pays no attention to the fact that if the optical disc were irradiated with a light beam with too low intensity or rotated with too high velocity, then the mark recorded would not represent the intended information exactly (i.e., would have poor recording quality).

It is therefore an object of the present invention to provide an optical disc drive that can improve the quality of a mark that has been recorded on an optical disc.

SUMMARY OF THE INVENTION

An optical disc drive according to the present invention can write information on an optical disc, and includes an optical pickup and a writing control section for instructing the optical pickup to record a mark, representing the information to be written, on the optical disc. In recording the mark on the optical disc, the writing control section instructs the optical pickup to irradiate the same area on the optical disc with a light beam a plurality of times so that the mark is recorded in that repeatedly irradiated area.

In one preferred embodiment of the present invention, the writing control section instructs the optical pickup to record a mark on an optical disc on which information has already been written in a different form.

In this particular preferred embodiment, the information has already been written in the form of pre-pits on the optical disc.

In a specific preferred embodiment, the mark is recorded so as to overlap with at least ten pre-pits.

In another preferred embodiment, the writing control section makes the optical pickup irradiate the optical disc with the light beam continuously while the mark is being recorded.

In this particular preferred embodiment, the optical disc drive includes a tracking control section for performing a tracking control based on the information that is provided by the pre-pits and that is included in a signal representing reflected light that has been detected by the optical pickup.

In a specific preferred embodiment, while the mark is being recorded, the tracking control section performs the tracking control based on that information provided by the pre-pits and included in the signal representing the reflected light that has been detected by the optical pickup.

In still another preferred embodiment, as the optical disc is irradiated with the light beam a plurality of times, the writing control section increases the intensity of the light beam gradually.

In yet another preferred embodiment, the optical disc drive includes a spindle section for rotating the optical disc. The writing control section controls the spindle section so that as the optical disc is irradiated with the light beam an increasing number of times, the number of revolutions of the disc decreases gradually.

In yet another preferred embodiment, the writing control section determines, by number-of-times information that is stored in advance on the optical disc, how many times the optical disc needs to be irradiated with the light beam.

In yet another preferred embodiment, the optical disc includes a test area on which a test write operation is performed. The writing control section makes the optical pickup irradiate respective portions of the test area on the optical disc with a light beam mutually different numbers of times and thereby write a plurality of test marks on those portions of the test area, and then determines, by making the optical pickup scan the test marks written, how many times the optical disc needs to be irradiated with the light beam.

Another optical disc drive according to the present invention can also write information on an optical disc, and includes an optical pickup and a writing control section for instructing the optical pickup to record a mark, representing the information to be written, on the optical disc. In recording a mark on the optical disc, the writing control section makes the optical pickup write a tentative mark on the optical disc by irradiating the optical disc with a light beam, determines whether or not the tentative mark has been written as intended, and unless the tentative mark has been written as intended, makes the optical pickup irradiate the optical disc with the light beam again so that a mark is overlaid on the tentative mark that has been written on the optical disc.

According to the present invention, when a mark is recorded on an optical disc, the quality of the recorded mark can be improved.

DETAILED DESCRIPTION OF PREFERRED EMBODIMENTS

Hereinafter, preferred embodiments of an optical disc drive according to the present invention will be described.

An optical disc drive according to the present invention can write information on an optical disc, and includes an optical pickup and a writing control section for instructing the optical pickup to record a mark, representing the information to be written, on the optical disc. In recording the mark on the optical disc, the writing control section instructs the optical pickup to irradiate the same area on the optical disc with a light beam a plurality of times so that the mark is recorded in that repeatedly irradiated area. Consequently, a mark of higher quality can be recorded on an optical disc.

Embodiment 1

A first specific preferred embodiment of an optical disc drive according to the present invention will be described with reference to the accompanying drawings.

1. Configuration of the First Preferred Embodiment 1.1. Optical Disc Drive's Arrangement (FIG. 1)

First of all, an exemplary arrangement for an optical disc drive 500 as a first preferred embodiment of the present invention will be described with reference to FIG. 1. The optical disc drive 500 may be used in personal computers, optical disc players, optical disc recorders and other devices that use an optical disc.

Figure 1:
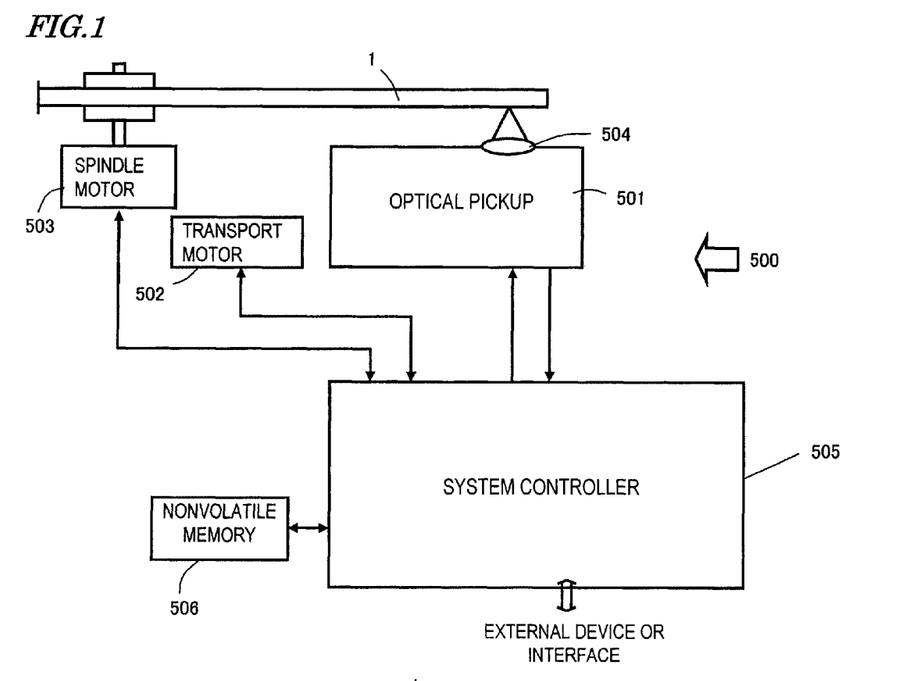
FIG. 1 is a block diagram illustrating an exemplary arrangement for an optical disc drive as a first preferred embodiment of the present invention.

FIG. 1 is a block diagram illustrating an exemplary arrangement for the optical disc drive 500. As shown in FIG. 1, the optical disc drive 500 includes an optical pickup 501, a spindle motor 503 for rotating a given optical disc 1, a transport motor 502 for controlling the position of the optical pickup 501, a system controller 505 for controlling the operations of all of these components, and a nonvolatile memory 506.

Data is optically read out from the optical disc 1, and photoelectrically converted by the photodetector (not shown) of the optical pickup 501 into an electrical signal, which is then passed to the system controller 505. The optical pickup 501 includes a light source (such as a semiconductor laser diode) for emitting a light beam, an objective lens 504 for condensing the light beam and forming a light beam spot on the optical disc 1, an actuator for driving the objective lens 504, and other known members.

Based on the electrical signal provided by the optical pickup 501, the system controller 505 generates servo signals including a focus error signal and a tracking error signal, and performs various kinds of signal processing such as waveform equalization on the read signal, binarization/slicing, and data synchronization.

By using those servo signals generated, the system controller 505 makes the light beam spot, which is formed by the optical pickup 501 on the optical disc 1, follow the target track on the rotating optical disc 1. The system controller 505 gets a series of control operations, including focus and tracking controls using the objective lens 504 of the optical pickup 501, an optical pickup transport control, and a control of the spindle motor, done as digital servo operations. That is to say, the system controller 505 generates various control signals to drive appropriately the actuator (not shown) of the objective lens 504, the transport motor 502 that moves the optical pickup 501 either inward or outward with respect to the optical disc 1, and the spindle motor 503 that rotates the optical disc 1. It should be noted that the system controller 505 could be implemented as a semiconductor IC.

The nonvolatile memory 506 stores a software program to be executed by the system controller 505, various parameters, and other sorts of information, which include location information indicating exactly where on the optical disc 1 marks 3 should be recorded.

Figure 2A:
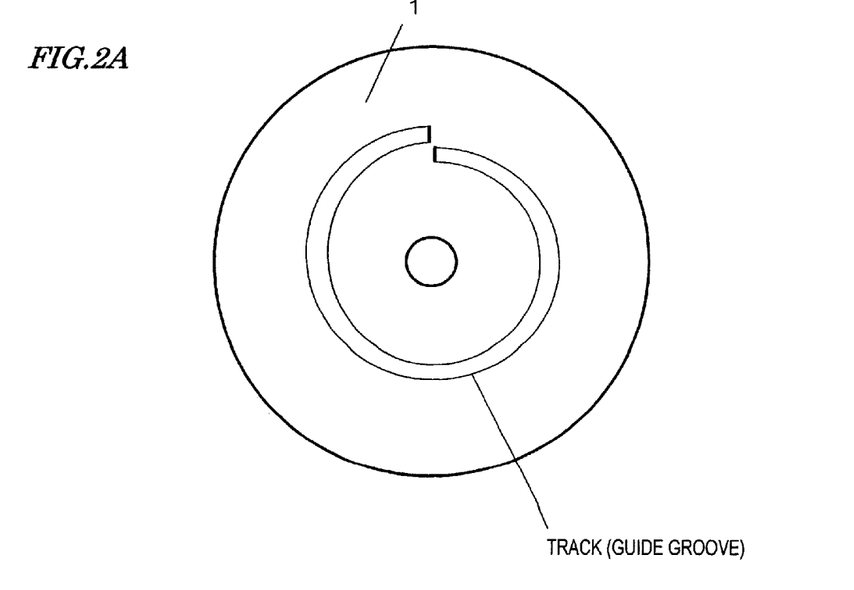
FIG. 2A is a plan view illustrating an optical disc according to the first preferred embodiment.
Figure 2B:
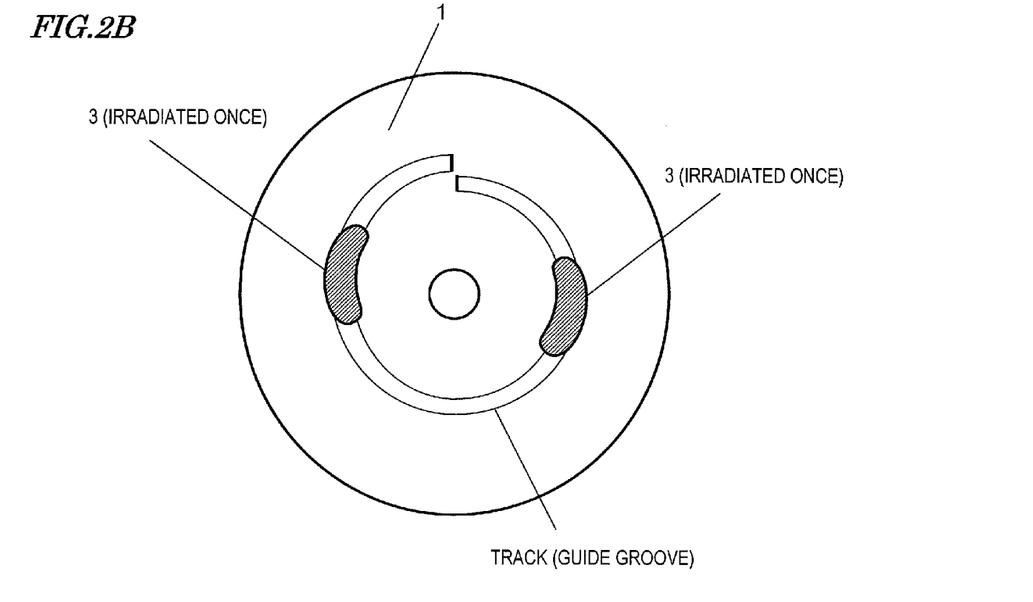
FIG. 2B illustrates an intermediate state in which marks are being recorded on the optical disc of the first preferred embodiment.
Figure 2C:
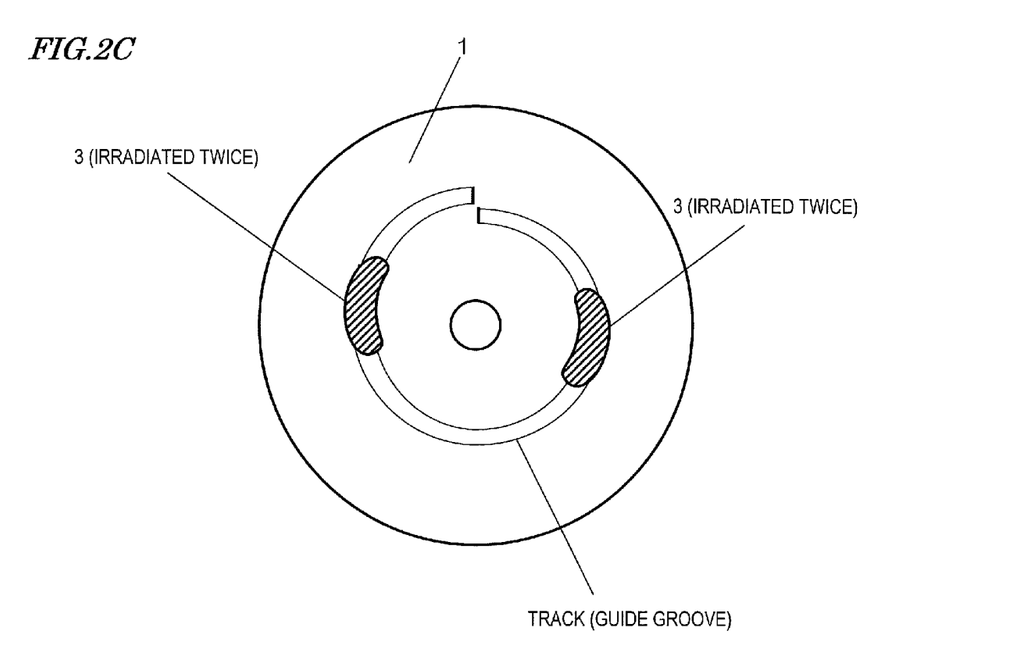
FIG. 2C illustrates a state in which the marks have already been recorded on the optical disc of the first preferred embodiment.

1.2. Optical Disc's Structure (FIGS. 2A, 2B and 2C)

Next, the structure of the optical disc 1 will be described with reference to FIGS. 2A, 2B and 2C.

The optical disc 1 is a storage medium on which information can be written by the optical disc drive 500. On the optical disc 1, either guide grooves or pre-pits have been formed in advance. In the example illustrated in FIG. 2A, guide grooves have been formed on the optical disc 1. The optical disc 1 includes a substrate, a recording film, and a protective coating. The substrate of the optical disc 1 may be made of polycarbonate, for example. The guide grooves or pre-pits are arranged either concentrically or spirally to form tracks. The principal surface of the substrate with those pre-pits functions as a read-only information storage plane (which will be referred to herein as a "ROM plane").

When the optical disc drive shown in FIG. 1 starts to operate by being loaded with the optical disc 1, the recording film is irradiated with the light beam that has been emitted from the optical pickup 501. Specifically, the light beam is condensed by the objective lens 504 onto the recording film, thereby forming a light beam spot on the recording film. As the optical disc 1 rotates, the light beam spot moves on the optical disc in its rotating direction. When information is written on the recording film, the recording film is irradiated with a writing light beam. As a result, that irradiated portion of the recording film has its optical properties changed in terms of reflectance, transmittance and phase difference.

As will be described later, in a preferred embodiment of the present invention, the same portion of the recording film is irradiated with a light beam a plurality of times to record a mark on that portion. This technique is quite different from a conventional writing technique, by which a mark is recorded on an optical disc by irradiating the disc with multiple pulses of light in accordance with a write strategy. Specifically, according to the conventional multi-pulse irradiation, respective pulses of the light irradiate mutually different portions of the recording film. On the other hand, according to the present invention, the same portion of the recording film is irradiated with the light beam over and over again, thereby "overlaying" the same recorded mark there. Consequently, according to the present invention, by irradiating the same portion of the recording film with a light beam several times, not just once, the optical property of that irradiated portion of the recording film is changed so as to reach the intended level.

A portion of the recording film, of which the optical properties have changed due to the exposure to the writing light beam, will serve as a recorded mark. By recording a plurality of marks along the tracks, information can be written on the recording film. If a track with the recorded marks is scanned with a scanning light beam, the intensity of the reflected light (which will be referred to herein as a "reading light beam") varies depending on whether there is a recorded mark there or not. And by detecting the intensity of the reading light beam, the information that has been written on the recording film can be read out. Since the intensity of the reading light beam will vary at radio frequencies, the read signal is often called an "RF signal".

FIG. 2B illustrates an intermediate state in which marks are being recorded on the optical disc 1, while FIG. 2C illustrates a state in which marks 3 have already been recorded on the optical disc 1. In this example, by irradiating the same area on the optical disc 1 with a light beam twice, a recorded mark 3 can be formed on that area. However, this is only an example and the number of times to irradiate the same area with a light beam to record a mark 3 there does not have to be two but may also be three or more.

When the information added to the recording film is read, the recording film is irradiated with a relatively weak light beam that has been emitted from the optical pickup. The recording film that can be used effectively in this preferred embodiment can reflect that weak light even if the recording film has no special reflective layer. That is to say, the recording film functions as not just a recording film but also a reflective film as well. The recording film may be made of a phase change material such as Ge, Sb, Te, In or Ag. With the recording film of such a phase change material, the recorded marks can be rewritten. Alternatively, the recording film may also be made of an inorganic or organic material such as Te, Pd, O, Cu, Ge, Bi or N. Once recorded on a recording film made of such a material, a mark is no longer rewritable. Still alternatively, the recording film may also be a metallic film of Al or Ag, for example. If such a metallic film is irradiated with intense light, holes can be cut through the metallic film. And those holes correspond to the recorded marks.

In this preferred embodiment, the recording film does contact with the surface of the substrate with the guide grooves or pre-pits (i.e., the principal surface). However, another film or layer may be interposed between the principal surface of the substrate and the recording film.

The optical disc 1 has a lead-in area and a data area. In the lead-in area, stored are the optical disc's ID and various kinds of control data (including not only physical format information such as disc type, disc size, maximum transfer rate information, number of layers, track path direction, recording linear density, and track density but also the number of times to irradiate the disc with a light beam when a mark needs to be recorded there). On the data area, on the other hand, data is written by the optical disc drive 500.

2. How Optical Disc Drive Works 2.1. Writing Control by System Controller 505

Hereinafter, it will be described how the system controller 505 performs a writing control when recording marks 3. In this preferred embodiment, information indicating the number of times to irradiate the optical disc 1 with a light beam is stored on the optical disc 1.

On receiving an instruction from an external device, the system controller 505 operates so as to write information (i.e., record a mark) on the optical disc 1. Specifically, in accordance with the instruction received from the external device, the system controller 505 determines the locations, recording lengths and arrangement of the marks that are going to be recorded. And by reference to these pieces of information collected, the system controller 505 controls the optical pickup 501. At this point in time, the system controller 505 also determines how many times the optical disc needs to be irradiated with the light beam by performing the following operations. It should be noted that the intensity of the light source to use when the optical pickup 501 performs a write operation has been determined in advance.

Figure 3:
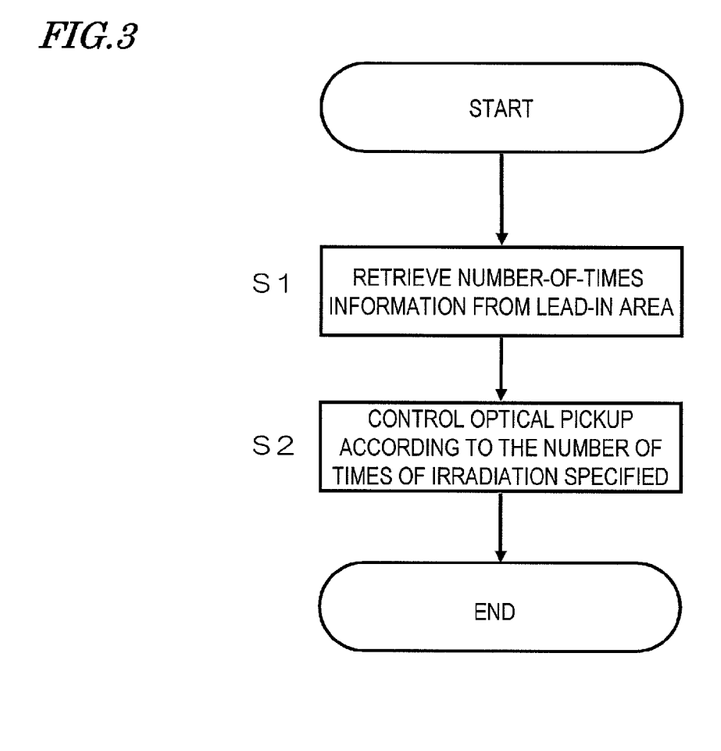
FIG. 3 is a flowchart showing how the optical disc drive of the first preferred embodiment operates.

Hereinafter, the operation of the system controller 505 will be outlined with reference to FIG. 3 in the following order:
1. start preparing to record a mark;
2. perform the processing step S1 of retrieving information indicating the number of times the optical disc 1 needs to be irradiated with light from the lead-in area of the disc 1;
3. perform the processing step S2 of controlling the optical pickup according to the number of times to irradiate the disc 1; and
4. record the mark finally.

Specifically, first of all, the system controller 505 extracts information, indicating how many times the disc 1 needs to be irradiated with a light beam, from the control data that is stored on the optical disc 1 (in Step S1). This information indicating the number of times to irradiate the disc with light is indispensable information because the required number of times of irradiation changes from one disc to another. That is to say, although information can be written sufficiently accurately on one disc by irradiating it with light only once, another disc may need to be irradiated with light twice to write the same piece of information there accurately enough. Thus, an optical disc itself could be significantly different from others depending on exactly how the disc has been manufactured. That is why if such information about the minimum required number of times of irradiation is stored on an optical disc, then the number of times of irradiation can be controlled according to each individual disc loaded.

Next, the system controller 505 controls the optical pickup 501 according to the minimum required number of times of irradiation specified (in Step S2). In response, the optical pickup 501 records a mark on the optical disc 1 by irradiating the disc 1 the specified number of times. This processing step will be described in further detail. In this example, a mark can be recorded by irradiating the disc with a light beam twice. Specifically, first off, the optical pickup 501 irradiates the optical disc with a light beam with a predetermined intensity, thereby recording marks on the disc. As shown in FIG. 2B, recorded marks have been formed on the optical disc 1 as a result of this first irradiation. Next, the optical pickup 501 overlays marks on the recorded marks that have already been formed as shown in FIG. 2B by irradiating the disc with light with the predetermined intensity again. As a result, marks are recorded on the optical disc 1 as shown in FIG. 2C through these two irradiation process steps.

According to this preferred embodiment, a mark is recorded on an optical disc by irradiating the same area on the disc with light at least twice. In this manner, a mark of higher quality can be recorded on the optical disc. This technique can be used particularly effectively in a situation where the optical power of the light source is low.

3. Modified Example of Embodiment 1

In the preferred embodiment described above, the optical disc 1 has guide grooves. However, an optical disc with pre-pits has the following advantages over such an optical disc with the guide grooves. Specifically, if a mark has been recorded over pre-pits and if a signal representing those pre-pits that are overlapped by the recorded mark can still be obtained, a tracking control can be carried out using the pre-pit signal during reading. In that case, the tracking control can be performed based on a differential phase detection (DPD) signal, which can be obtained from the pre-pits. A DPD signal is a tracking error signal that can be used effectively to follow a chain of pre-pits, which are deep enough to make the RF signal generated have sufficiently large amplitude.

According to this preferred embodiment, it is also possible to avoid an unwanted situation where recording a mark with too intense an light beam has erased the information that should be provided by pre-pits and made a pre-pit signal no longer available in the first place.

Also, in the preferred embodiment described above, information indicating the number of times of irradiation is supposed to be extracted from the control data on the optical disc 1. However, this is only an example and that information may be obtained in the following manner, too.

1) Retrieved from the Nonvolatile Memory 506:

If the information indicating the number of times of irradiation is stored in advance in the nonvolatile memory 506, the system controller 505 can retrieve that information from the nonvolatile memory 506. In that case, it will be difficult to perform the control on a disc-by-disc basis, but it will be easier for the optical disc drive 500 to get that control done.

2) Retrieved from the Nonvolatile Memory 506 Using the Optical Disc's ID:

Alternatively, that information indicating the number of times of irradiation may be stored in the nonvolatile memory 506 so as to be associated with an individual optical disc's ID. In that case, the system controller 505 can get the ID from the given optical disc and retrieve information indicating the number of times of irradiation that is associated with that ID.

Embodiment 2

Hereinafter, a second specific preferred embodiment of an optical disc drive according to the present invention will be described in detail with reference to FIGS. 4 and 5. The description of common features between the first preferred embodiment described above and this second preferred embodiment will be omitted herein to avoid redundancies.

1. Configuration of the Second Preferred Embodiment 1.1. Optical Disc Drive's Arrangement The optical disc drive of this second preferred embodiment has the same arrangement as its counterpart of the first preferred embodiment described above.

1.2. Optical Disc's Structure (FIG. 4)

The optical disc has a test area 600 in its lead-in area. The test area 600 is supposed to have sectors A through J.

2. How Optical Disc Drive Works 2.1. Writing Control by System Controller 505

Hereinafter, it will be described how the system controller 505 performs a writing control.

On receiving an instruction from an external device, the system controller 505 writes information (i.e., records a mark) on the optical disc 1.

Figure 5:
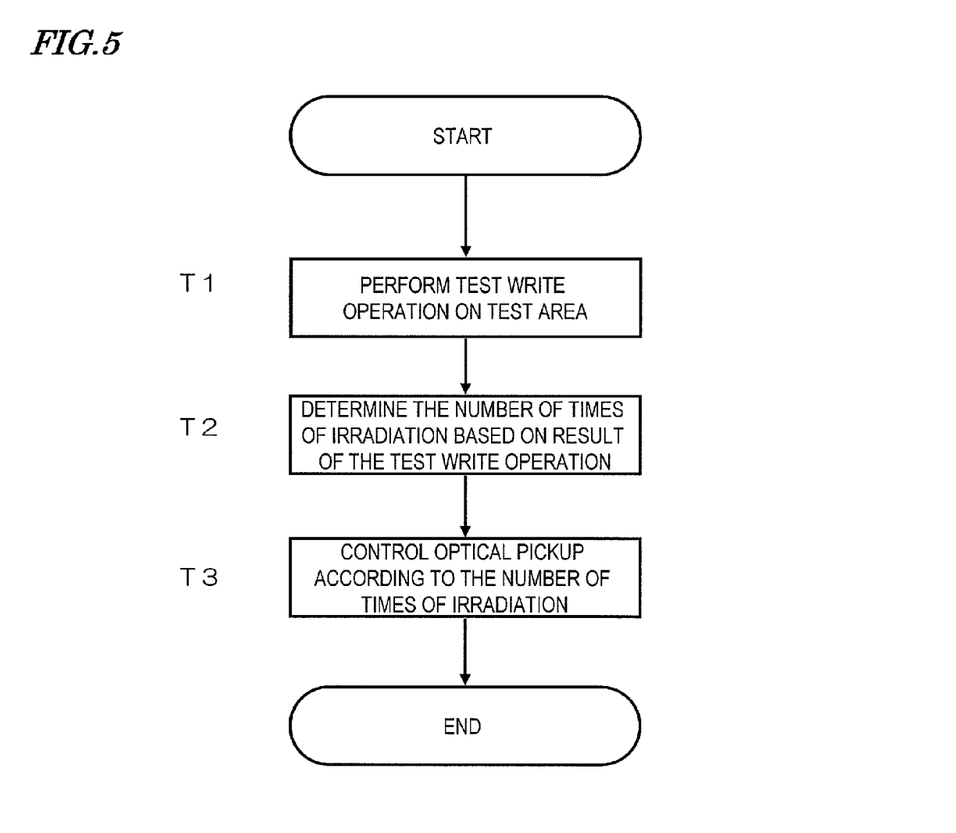
FIG. 5 is a flowchart showing how the optical disc drive of the second preferred embodiment operates.

The operation of the system controller 505 will now be outlined with reference to FIG. 5.

1. start preparing to record a mark;
2. perform the processing step T1 of performing a test write operation on the test area 600;
3. perform the processing step T2 of determining the number of times of irradiation based on a result of the test write operation;
4. perform the processing step T3 of controlling the optical pickup according to the number of times of irradiation; and
5. record the mark finally.

First of all, the system controller 505 determines, by using the test area 600 on the optical disc 1, how many times the optical disc 1 needs to be irradiated with a light beam (in Step T1). Specifically, this processing step T1 may be carried out in the following manner:

The system controller 505 gets test marks written on the test area 600 on the optical disc 1 by controlling the optical pickup 501. The optical pickup 501 writes test marks with a predetermined light intensity. In this case, the test marks are written on respective portions of the test area 600 by irradiating those portions with a light beam mutually different numbers of times. That is to say, the test marks include a mark that has been written by irradiating a portion of the test area with a light beam only once, a mark that has been written by irradiating another portion of the test area with the light beam twice, . . . and a mark that has been written by irradiating yet another portion of the test area with the light beam ten times.

Figure 4:
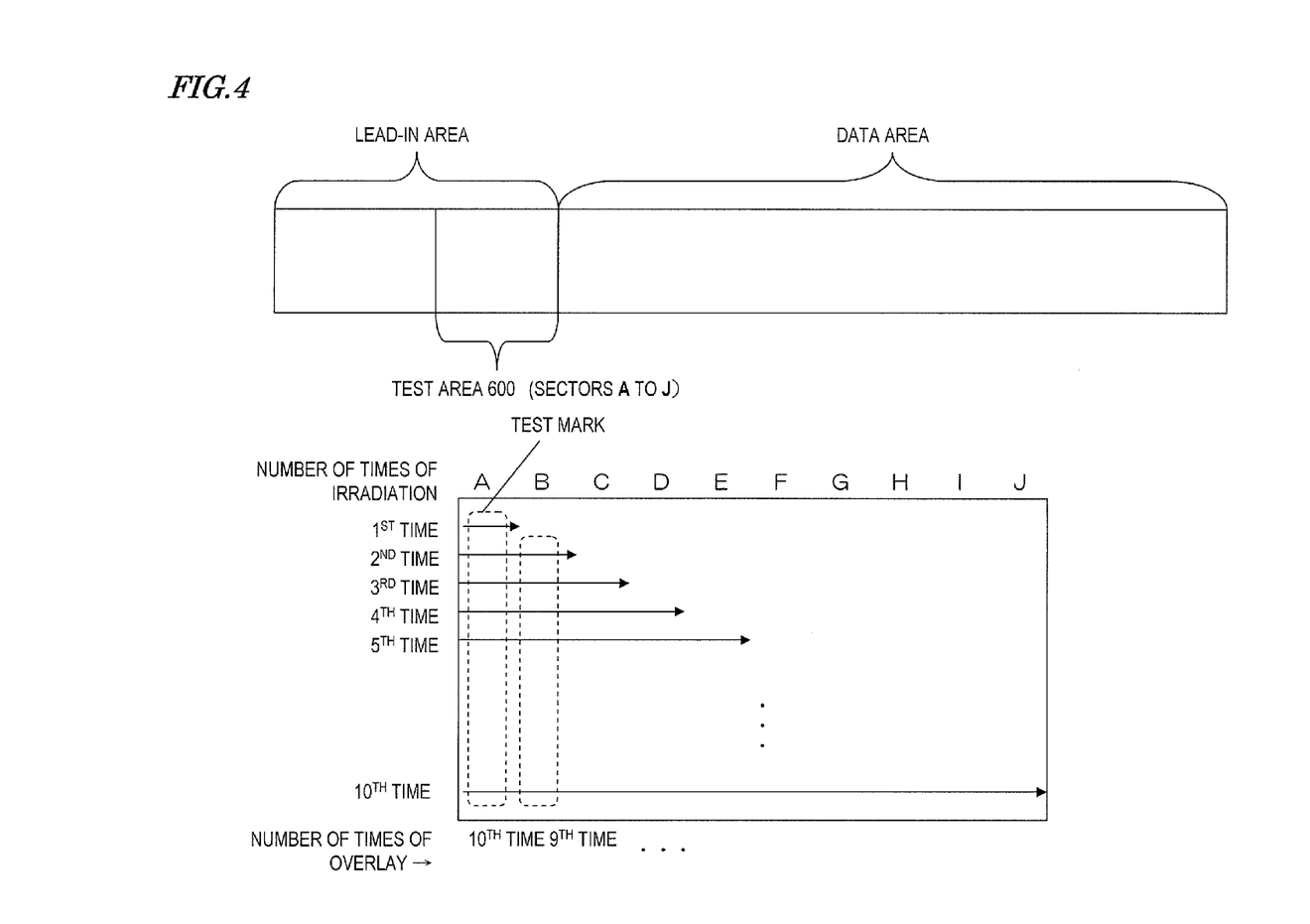
FIG. 4 illustrates where a test area is located and how test marks are written there according to a second preferred embodiment of the present invention.

According to this preferred embodiment, the test marks are written as shown in FIG. 4.

Specifically, first, the optical pickup 501 irradiates only portion A with a light beam. Next, the optical pickup 501 irradiates portions A and B with a light beam. Then, the optical pickup 501 irradiates portions A, B and C with a light beam. By performing such an operation on the rest of the test area 600 with all of the portions A through J eventually irradiated with a light beam the last time around, a test mark is written on the portion A that has been irradiated with the light beam ten times, another test mark is written on the portion B that has been irradiated with the light beam nine times, and so forth.

After that, by scanning the test marks that have been written on the test area 600, the system controller 505 determines the number of times of irradiation that would match the predetermined condition most closely (in Step T2). The predetermined condition may be "the degree of modulation is closest to 55%", for example. However, this is just an example and the present invention is in no way limited to this specific example.

Subsequently, in Step T3, the system controller 505 controls the optical pickup 501 according to the number of times of irradiation determined.

According to this second preferred embodiment, the system controller 505 can learn, through test write operations, how a recorded mark will change according to the number of times of irradiation, and therefore, can select the best number of times of irradiation on a disc-by-disc basis. As the quality of each individual optical disc tends to vary according to the manufacturing process condition, the writing method of this preferred embodiment is particularly effective.

Embodiment 3

Hereinafter, a third specific preferred embodiment of an optical disc drive according to the present invention will be described in detail with reference to FIG. 6A. The description of common features between the first preferred embodiment described above and this third preferred embodiment will be omitted herein to avoid redundancies.

1. Configuration of the Third Preferred Embodiment 1.1. Optical Disc Drive's Arrangement The optical disc drive of this third preferred embodiment has the same arrangement as its counterpart of the first preferred embodiment described above.

1.2. Optical Disc's Structure

The optical disc has the same structure as its counterpart of the first preferred embodiment described above.

2. How Optical Disc Drive Works 2.1. Writing Control by System Controller 505

Hereinafter, it will be described how the system controller 505 performs a writing control.

On receiving an instruction from an external device, the system controller 505 writes information (i.e., records a mark) on the optical disc 1.

Figure 6A:
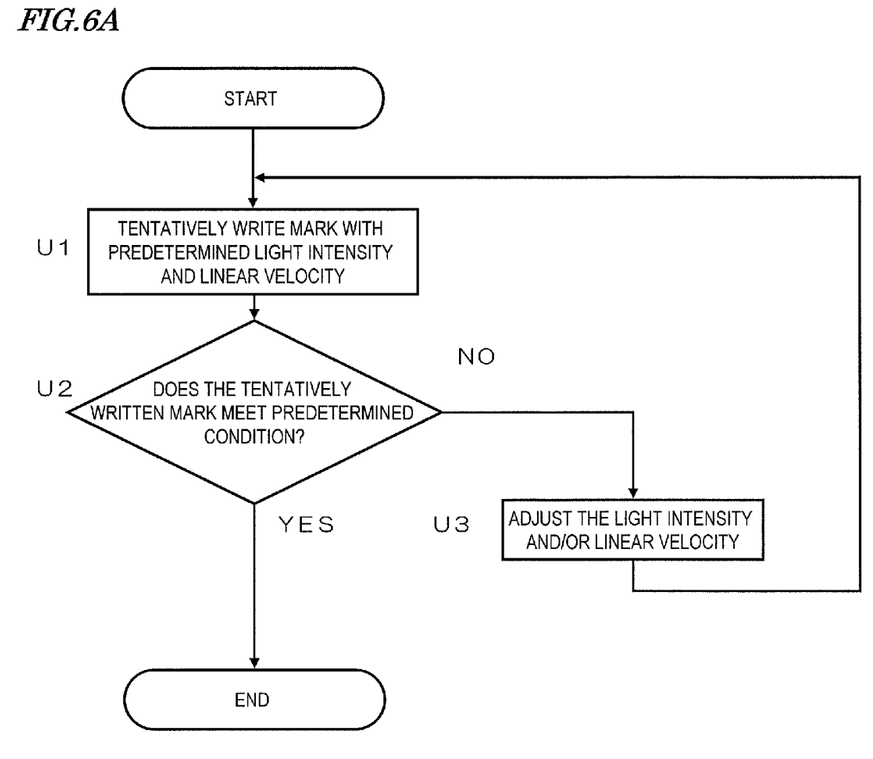
FIG. 6A is a flowchart showing how an optical disc drive as a third preferred embodiment of the present invention operates.

The operation of the system controller 505 will now be outlined with reference to FIG. 6A.
1. start preparing to record a mark;
2. perform the processing step U1 of tentatively writing a mark with predetermined light intensity and linear velocity, which are determined by the intensity of the light beam emitted and the number of revolutions of the optical disc, respectively;
3. perform the processing step U2 of checking the quality of the tentatively written mark to decide whether or not the mark meets a predetermined condition;
4. perform the processing step U3 of adjusting the light intensity and/or linear velocity; and
5. record a mark finally.

First of all, in Step U1, the system controller 505 gets a mark tentatively written on the optical disc 1 with the predetermined light intensity and linear velocity. In this processing step, the system controller 505 instructs the optical pickup 501 to write the tentative mark by irradiating the disc with a light beam only once.

Next, in Step U2, the system controller 505 checks the quality of the mark that has been tentatively written on the optical disc 1. Specifically, the system controller 505 determines whether or not the degree of recording modulation of the signal obtained by the detector of the optical pickup 501 is equal to or higher than 50%. Although a degree of recording modulation of 50% or more is supposed to be used as a threshold value in this preferred embodiment, this is nothing but an example.

If the answer to the query of this processing step U2 is YES, this writing control by the system controller 505 ends.

Otherwise, the process advances to the next processing step U3.

In the processing step U3, the system controller 505 adjusts the light intensity and the linear velocity. After having made these adjustments, another mark is overlaid on the previous tentatively written mark by irradiating the latter mark with a light beam all over again. According to this preferred embodiment, the quality of a written mark can be checked every time the mark is irradiated with a light beam, and therefore, unnecessary irradiation can be cut down. On top of that, if a mark is written over pre-pits with meaningful information, those pre-pits overlapped by the written mark will not be deformed and a pre-pit signal can be left as it is more easily.

Other Embodiments

Figure 6B:
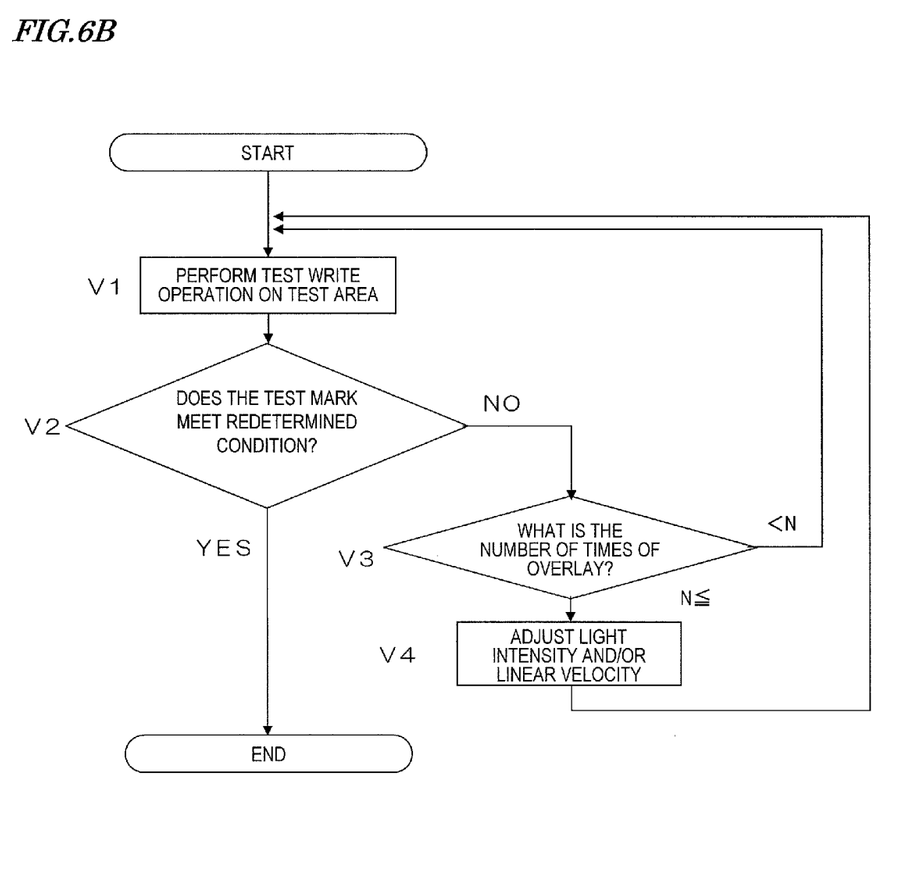
FIG. 6B is a flowchart showing how an optical disc drive as an alternative preferred embodiment of the present invention operates.

FIG. 6B is a flowchart showing how the optical disc drive works when the second and third preferred embodiments of the present invention described above are combined.

In this alternative preferred embodiment, after a test write operation has been performed in Step V1 on a test area, the test mark is scanned to determine in Step V2 whether or not the test mark satisfies a predetermined condition. If the answer is YES (i.e., if the test mark that has been written by irradiating the area only once meets the predetermined condition), the test write operation ends. On the other hand, if the answer is NO (i.e., if the test mark written fails to satisfy the predetermined condition), the test written mark is irradiated with a light beam once again, thereby overlaying a mark on that test mark (i.e., the mark is irradiated for the second time). And the system controller 505 determines whether or not the test written mark thus formed satisfies the predetermined condition and then performs the same series of processing steps all over again depending on the result of the decision.

According to this preferred embodiment, every time (or every predetermined number of times) the same particular portion of the test area is irradiated with the light beam, the quality of the overlaid written mark is checked. And if the quality has turned out to be short of the minimum required level, a mark is overlaid all over again. And if it has turned out in Step V3 that quality of the test mark is still less than the minimum required level even after the overlay operation has been performed a predetermined number of times (which is supposed to be N times in this example), then the light intensity and linear velocity are adjusted in the next processing step V4 and then a test write operation is performed again.

The present invention is in no way limited to the specific preferred embodiments described above but may also be carried out in any other appropriately modified form. For example, in an alternative preferred embodiment of the present invention, each mark may be recorded so as to overlap with a lot of pre-pits.

Figure 7:
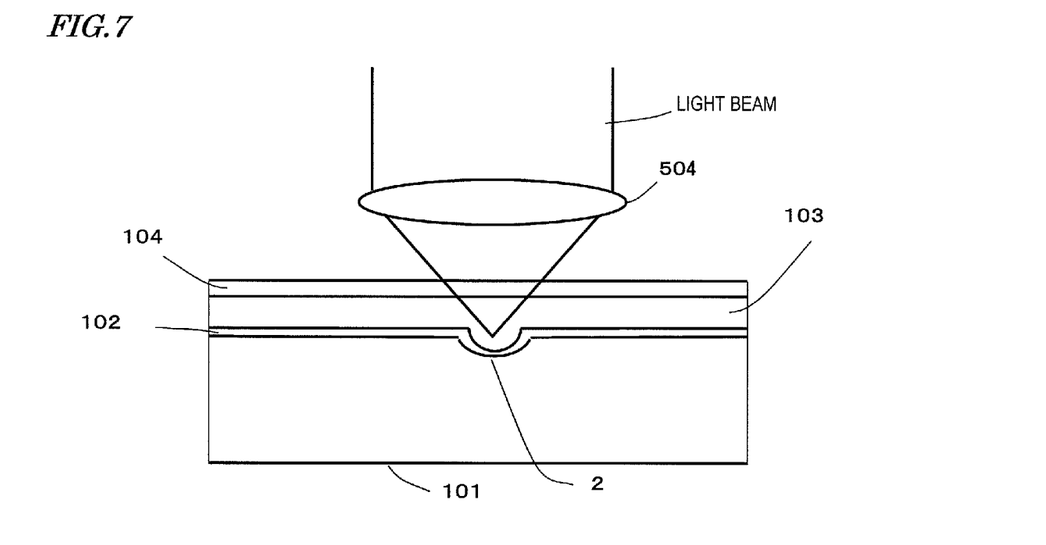
FIG. 7 is a cross-sectional view of an optical disc.

FIG. 7 schematically illustrates a part of a cross section of the optical disc 1. As shown in FIG. 7, the optical disc 1 includes a substrate 101, of which the principal surface has a pre-pit 2, and a multilayer structure, which is supported on the principal surface of the substrate 101. The multilayer structure of this preferred embodiment includes a recording film 102, a protective film 103, and a hard coating 104, which are stacked in this order on the substrate 101.

In writing data on the optical disc 1, the optical disc drive 500 shown in FIG. 1 has the recording film 102 irradiated with a light beam, which has been emitted by the optical pickup 501 and then transmitted through the hard coating 104, thereby recording a mark 3 on the recording film 102.

The substrate 101 forms the supporting base of the optical disc 1. Although only one pre-pit 2 is illustrated in FIG. 7, a huge number of pre-pits 2 are actually formed on the principal surface of the substrate 101, on which the recording film 102 is deposited. Those pre-pits 2 are physical dents or projections on the principal surface of the substrate 101 and are made in the process step of forming the substrate 101 during the manufacturing process of the optical disc 1. Such a substrate 101 having those pre-pits 2 on its surface may be formed by a known process for manufacturing a BD-ROM.

If the wavelength of the light beam to emit is represented by $\lambda$, the depth of the pre-pits 2 may fall within the range of $\lambda/7$ through $\lambda/4$. For example, if $\lambda \approx 405$ nm, the pre-pits 2 typically have a depth of approximately 60-100 nm (i.e., approximately 0.06 μm through 0.1 μm). The length of the pre-pits 2 as measured in the tracking direction may be from one through several times as long as 0.15 μm.

Figure 8:
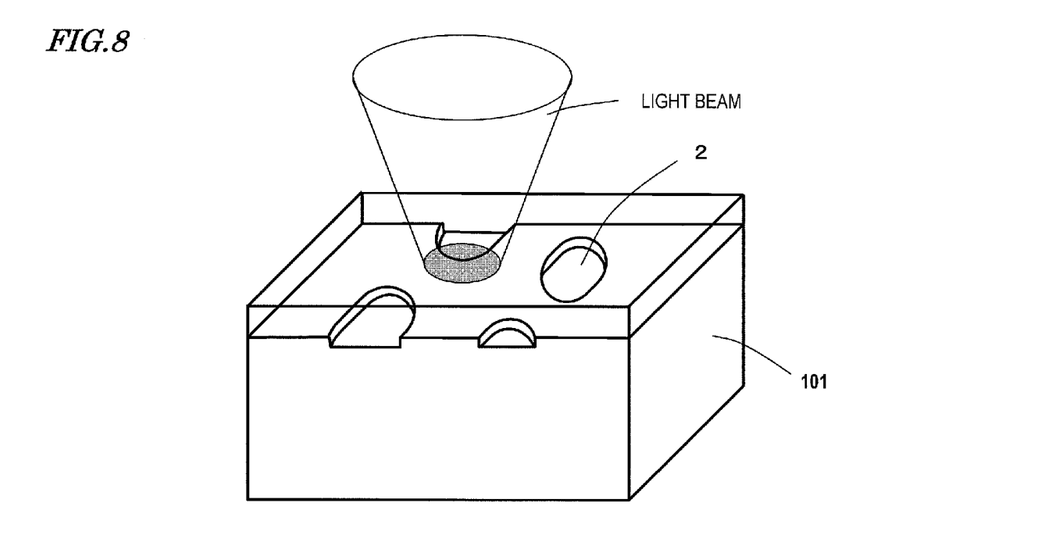
FIG. 8 is a perspective view illustrating pre-pits on an optical disc.

As shown in FIG. 8, the pre-pits 2 that have been made on the optical disc 1 of the example illustrated in FIG. 7 are "in-pits", which are depressed with respect to the light incident surface. Conversely, "on-pits" are raised with respect to the light incident surface. Although the pre-pits 2 are dents on the light incident surface of the substrate 101 in the example illustrated in FIGS. 7 and 8, pre-pits 2 may also be projections in another example.

Figure 9:
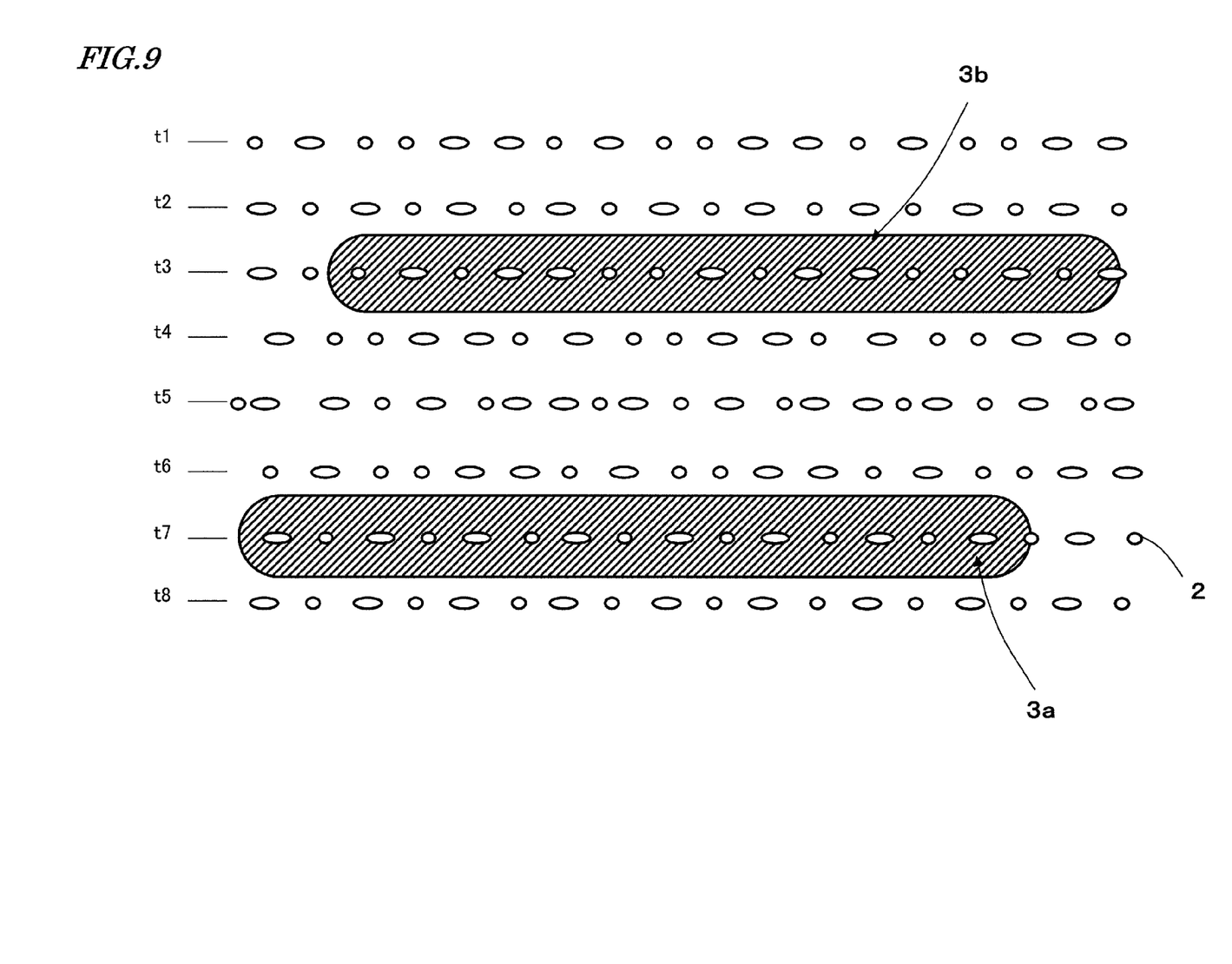
FIG. 9 illustrates where marks may be recorded on an optical disc.

FIG. 9 illustrates where the marks 3 may be recorded on an optical disc with such a structure. In the example illustrated in FIG. 9, the system controller 505 adjusts the locations of the recorded marks 3 so as to prevent a mark 3 recorded on one track from affecting any other mark 3 recorded on an adjacent track. Specifically, in FIG. 9, a first mark 3a has been recorded on a track t3 and a second mark 3b has been recorded on a track t7.

In the example illustrated in FIG. 9, the lengths of the recorded marks 3 as measured along the tracks are defined so that each of those recorded marks 3 overlaps with at least ten pre-pits 2. The length of each recorded mark 3 is at least 10 times, and preferably 50 or more times, as long as the shortest length of the pre-pits 2. For example, if the pre-pits 2 represent data that has been modulated by 1-7 modulation and if the length of one channel clock period is represented by T, the pre-pits 2 may have a minimum length of 2T and a maximum length of 8T. On the other hand, the lengths of the recorded marks 3 may be set to be 80T or more, for example. In a preferred embodiment of the present invention, each mark 3 is recorded by emitting a single continuous light beam with long duration, not in multiple pulses with short widths, from the light source.

By adopting such a configuration, a signal representing the pre-pits 2 and a signal representing the recorded mark 3, which are both included in the RF signal representing the light that has been reflected from the optical disc 1, can be separated more easily. The RF signal can be split into those two signals using a band-pass filter, for example.

In a situation where such a long mark has been recorded to overlap with a lot of pre-pits, if no pre-pit signal can be obtained anymore from an area irradiated with the writing light beam that has been used for recording the mark, no tracking error signal can be generated any longer using those pre-pits. And the longer the recorded mark, the longer the period of time for which no tracking control can be performed. However, the present inventors discovered that such a problem can be overcome by irradiating the same area on the optical disc with a light beam a plurality of times to record a mark on that area and by setting the intensity of the light beam emitted to be relatively low each time of irradiation. That is to say, according to the present invention, the intensity of the light emitted each time can be lower than usual, and therefore, deterioration of the pre-pit signal due to exposure to intense light can be avoided and the pre-pit signal can also be obtained appropriately even from the area on which a mark has been recorded.

In a preferred embodiment of the present invention, the tracking control section of the optical disc drive performs a tracking control based on the information provided by pre-pits, which is included in a signal representing the reflected light that has been detected by the optical pickup. More preferably, even while a mark is being recorded, the tracking control section also performs a tracking control based on the information provided by the pre-pits and included in the signal representing the reflected light that has been detected by the optical pickup.

The present invention is applicable for use in an optical disc drive that can write information on a given optical disc and in various types of electronic devices with such an optical disc drive built in.

What is claimed is:

1. An optical disc drive for writing information on an optical disc, the drive comprising
an optical pickup, and
a writing control section for instructing the optical pickup to record a mark, representing the information to be written, on the optical disc,
wherein in recording the mark on the optical disc, the writing control section instructs the optical pickup to irradiate the same location on the optical disc with a light beam a plurality of times so that the mark is repeatedly recorded in the irradiated location thereby overlaying the same recorded mark.

2. The optical disc drive of claim 1, wherein the writing control section instructs the optical pickup to record a mark on an optical disc on which information has already been written in a different form.

3. The optical disc drive of claim 2, wherein the information has already been written in the form of pre-pits on the optical disc.

4. The optical disc drive of claim 3, wherein the mark is recorded so as to overlap with at least ten pre-pits.

5. The optical disc drive of claim 1, wherein the writing control section makes the optical pickup irradiate the optical disc with the light beam continuously while the mark is being recorded.

6. The optical disc drive of claim 5, comprising a tracking control section for performing a tracking control based on the information that is provided by the pre-pits and that is included in a signal representing reflected light that has been detected by the optical pickup.

7. The optical disc drive of claim 6, wherein while the mark is being recorded, the tracking control section performs the tracking control based on that information provided by the pre-pits and included in the signal representing the reflected light that has been detected by the optical pickup.

8. The optical disc drive of claim 1, wherein as the optical disc is irradiated with the light beam a plurality of times, the writing control section increases the intensity of the light beam gradually.

9. An optical disc drive for writing information on an optical disc, the drive comprising
an optical pickup,
a writing control section for instructing the optical pickup to record a mark, representing the information to be written, on the optical disc, and
a spindle section for rotating the optical disc,
wherein in recording the mark on the optical disc, the writing control section instructs the optical pickup to irradiate the same location on the optical disc with a light beam a plurality of times so that the mark is recorded in that repeatedly irradiated location, and
wherein the writing control section controls the spindle section so that as the optical disc is irradiated with the light beam an increasing number of times, the number of revolutions of the disc decreases gradually.

10. An optical disc drive for writing information on an optical disc, the drive comprising
an optical pickup, and
a writing control section for instructing the optical pickup to record a mark, representing the information to be written, on the optical disc,
wherein in recording the mark on the optical disc, the writing control section instructs the optical pickup to irradiate the same location on the optical disc with a light beam a plurality of times so that the mark is recorded in that repeatedly irradiated location, and
wherein the writing control section determines, by number-of-times information that is stored in advance on the optical disc, how many times the optical disc needs to be irradiated with the light beam.

11. An optical disc drive for writing information on an optical disc, the drive comprising
an optical pickup, and
a writing control section for instructing the optical pickup to record a mark, representing the information to be written, on the optical disc,
wherein in recording the mark on the optical disc, the writing control section instructs the optical pickup to irradiate the same location on the optical disc with a light beam a plurality of times so that the mark is recorded in that repeatedly irradiated location,
wherein the optical disc includes a test area on which a test write operation is performed, and
wherein the writing control section makes the optical pickup irradiate respective portions of the test area on the optical disc with a light beam mutually different numbers of times and thereby write a plurality of test marks on those portions of the test area, and then determines, by making the optical pickup scan the test marks written, how many times the optical disc needs to be irradiated with the light beam.

12. An optical disc drive for writing information on an optical disc, the drive comprising
an optical pickup, and
a writing control section for instructing the optical pickup to record a mark, representing the information to be written, on the optical disc,
wherein in recording a mark on the optical disc, the writing control section makes the optical pickup write a tentative mark on the optical disc by irradiating the optical disc with a light beam, determines whether or not the tentative mark has been written as intended, and unless the tentative mark has been written as intended, makes the optical pickup irradiate the optical disc with the light beam again so that a mark is overlaid on the tentative mark that has been written on the optical disc.

* * * * *